United States Patent [19]

Diaz

[11] Patent Number: 5,114,593
[45] Date of Patent: May 19, 1992

[54] METHOD OF ABSORBING OIL USING POWDERED AQUATIC LILY PLANT

[75] Inventor: Jorge V. Diaz, Vergel Arboledas, Mexico

[73] Assignee: Luis R. Duhalt, a part interest

[21] Appl. No.: 734,887

[22] Filed: Jul. 24, 1991

[51] Int. Cl.$^5$ ............................................. C02F 1/28
[52] U.S. Cl. ................................. 210/691; 210/924; 210/922; 210/690; 134/7
[58] Field of Search ............... 210/690, 691, 693, 922, 210/924, 925; 134/7, 6

[56] References Cited

U.S. PATENT DOCUMENTS

| | | | |
|---|---|---|---|
| 3,382,170 | 5/1968 | Pape | 210/925 |
| 3,591,524 | 7/1971 | Eriksen | 210/924 |
| 5,009,790 | 4/1991 | Bustamante et al. | 210/924 |
| 5,039,414 | 8/1991 | Mueller et al. | 210/924 |

Primary Examiner—Stanley S. Silverman
Assistant Examiner—Cynthia L. Nessler
Attorney, Agent, or Firm—Richard W. Hanes

[57] ABSTRACT

The method of absorbing oil for clean-up comprising applying dry and pulverized aquatic lily to the spilled oil. The powdered water lily can be applied to both spills on land and water without adverse ecological effects.

6 Claims, 1 Drawing Sheet

METHOD OF ABSORBING OIL USING POWDERED AQUATIC LILY PLANT

BACKGROUND OF THE INVENTION

The invention relates to the use of an absorbent material in the form of dried and pulverized water lily to absorb spilled liquid, in particular, spilled oil products.

Oil spills, both on land and in bodies of water, are increasing at an alarming rate. Such spills, whether small or large, present clean-up problems, and arouse environmental concerns. Large spills frequently result from oil tanker accidents, as well as from damage to oil tanks or pipelines.

Smaller spills frequently occur from defective motor vehicles and many occur around service stations and vehicle repair facilities. Such spills can be difficult to clean up and can also contaminate ground water.

An oil or petroleum product spill at sea or on a body of water is particularly difficult to contain and clean up. Depending on the location of the spill the repercussions can be of political, social, economic and/or ecological nature.

Petroleum products spilled on water suffer changes in their properties due to solar radiation, and such changes make the spill even more difficult to control and eliminate. Also, the spill is frequently spread into a thin film as a result of the winds and marine currents. Even though spilled petroleum products are subject to a natural biodegration process induced by marine bacteria, such biodegration is extremely slow and does not prevent the environmental impact resulting from the spill.

The most significant impact of the spilled oil is felt in the local and regional ecology, as the spill affects both animals and plant life. The oil can become deposited on vegetable species which will hinder their development. The petroleum products also can enter the respiratory systems of underwater species and the oil can kill larval systems that it contacts. Birds and mammals of the area are also affected by the spill.

Many different techniques have been proposed to clean and contain oil spills. For example, floating booms have been used to contain marine spills, but such booms are time consuming to place as well as providing only limited effectiveness to contain a liquid film, such as oil, in rough seas.

Chemical and biological agents have also been applied to spills; however, such applications can result in even more disastrous environmental problems.

The use of an absorbent for cleaning up oil spills has proven to be particularly effective. Absorbents are typically cheap and easy to apply without the use of specially trained workers. Also, absorbents act quickly to aid in restraining the spill. Absorbents used in the past have included tree bark, wood fiber, and cellulosic materials, including corn, cigarette filters, paper pulp, cotton, polymeric resins, granulated rock, peat moss, saw dust, straw and sponges.

U.S. Pat. No. 4,070,287 to Wiegand et al., U.S. Pat. No. 4,519,918 to Ericsson et al., and U.S. Pat. No. 4,670,156 to Grenthe, all disclose the use of cellulose fibers as an oil absorbent. U.S. Pat. No. 3,562,153 to Tully et al. discloses the use of absorbent materials treated with colloidal solids, and U.S. Pat. No. 3,888,766 to De Young, discloses the use of expanded vermiculite for oil removal, while U.S. Pat. No. 4,770,715 to Mandel et al., discloses like use of a particulate of activated carbon.

U.S. Pat. No. 5,009,790 to Bustamante et al. discloses the use of an absorbent in the form of de-alginated, partially de-watered kelp. The kelp is an ocean plant and not available for harvest from fresh bodies of water, and requires extensive preparation prior to its use as an effective absorbent.

All of the foregoing prior art solutions have disadvantages, including prohibitive costs, limited availability and effectiveness, and difficulties in use.

It is therefore the primary object of the instant invention to provide a method for removing an oil type spill by use of an absorbent which is abundant, cheap to harvest and process, and effective in use.

It is a further object of the instant invention to provide a method for cleaning a petroleum product spill by use of an absorbent without detrimental ecological effects.

SUMMARY OF THE INVENTION

The instant invention relates to the method of removing spilled petroleum product by means of spreading an absorbent, comprising dried and pulverized water lily over the petroleum. The water lily is found in fresh bodies of water and is particularly abundant in Mexico and the Amazon region.

The preferred method for use comprises harvesting the abundant water lily (by either manual or mechanical methods), drying the plant by well known methods, pulverizing the dried plant, and applying the pulverized dried product to the spill. The resulting pulverized dried product is not detrimental to workers or the environment, thus it can be applied by unskilled workers or even dusted from a barge or an airplane.

DESCRIPTION OF THE PREFERRED EMBODIMENT

Figure 1:
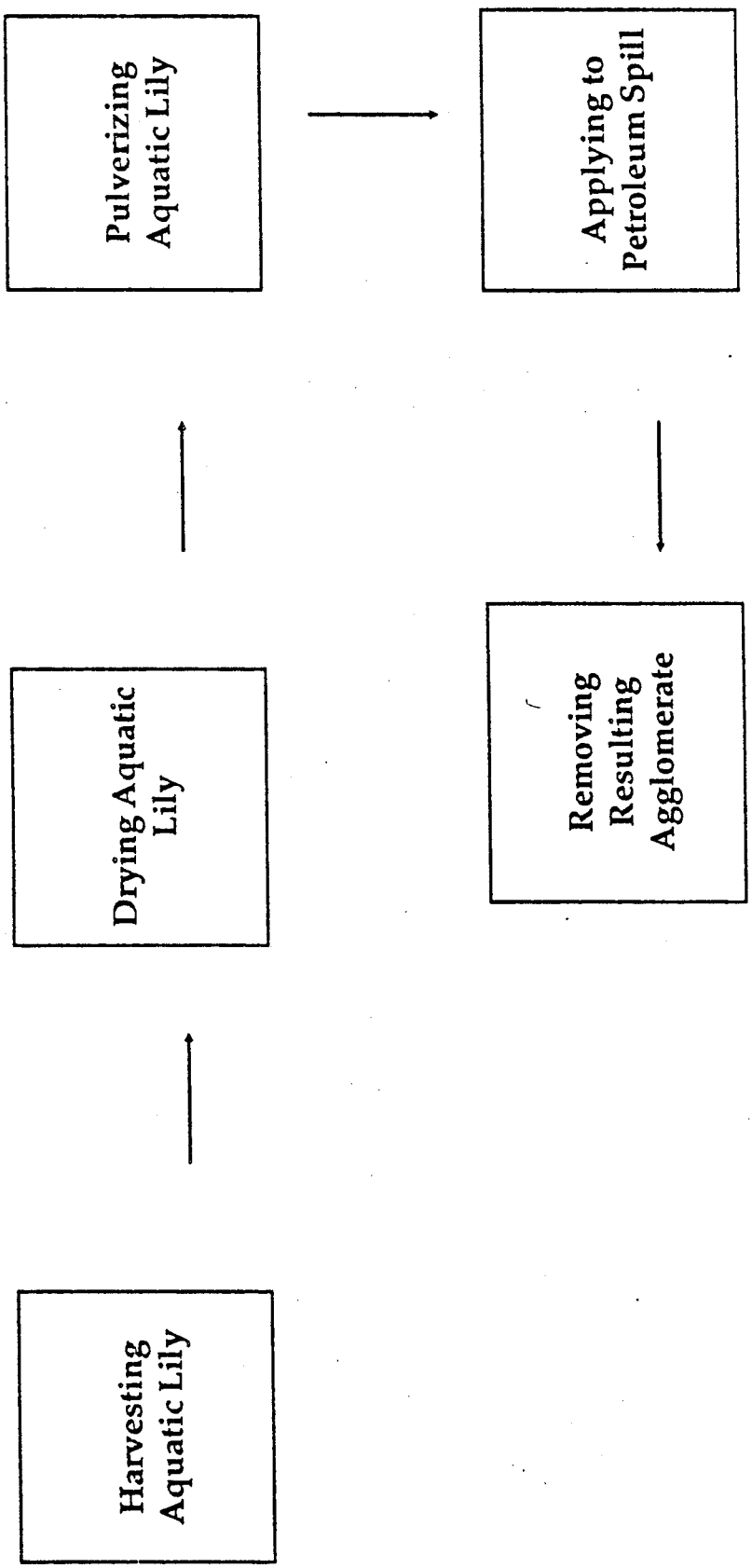
FIG. 1 is a block diagram illustrating the steps of the preferred method.

The water lily is a plant that is overabundant in Mexico. It is *Eichernia Crassipes*, or *Eichernid Azusea* also known as Water Lily, "Huachinango", "Pato", "Cucharilla" and "Jacinto de Agua". This plant has its origin in South America, specially in the Amazon basin. At the present time its range consists of all tropical and subtropical areas in the world. It has a high reproductive capacity and proliferates in lakes, holding dams, channels and, to a lesser degree, in rivers.

Two species are recognized today in Mexico. *Eichornia Crassipes*, distributed throughout Mexico, and *Eichornia Azusea*, which can be found only in hotter climates.

The water lily has proven resistant to various herbicides and other physical and biological control methods, due to its extraordinary reproductive power. Its prodigious ability to spread has a detrimental ecological effect.

This plant is associated with other aquatic species, such as: Heidrocotile Ranunculoides, Wolfa Gladiata and Lemna Gibba. Its taxonomical table is as follows:

| Kingdom: | Vegetal |
| --- | --- |
| Subkingdom: | Phanerogams |
| Type: | Angiosperm |

| | |
|---|---|
| Class: | Monocotiledonian |
| SubClass: | Superovarieas |
| Series: | Periantides |
| Order: | Parinosaea |
| Family: | Pontederiaceae |
| Genus: | Eichornia |
| Species: | Crassipes |

The mature plant consists of: Roots, Rizonmae, Stolon, Leaves, Inflorescence and fruit cluster.

It has an incipient root system; the apical meristem of the root is covered with a special protective tissue called "coif". In the case of the lily, a small lengthening bag of about 1 cm. is formed and the coif protects the young tissue from attack by aquatic insects. It has a short stem that extends underwater by a ribozom, which in adult plants measures from 8 to 35 cms. and has large quantities of air conducting and storing tissue. This is important because floating plants must use fully the small amount of oxygen they take from the water, which they get by passing oxygen to a special tissue in the leaves through a highly modified aeration system. This system is formed mainly by large intercellular spaces filled with air. The cells from this tissue are star-like, and are called eschlerids. This tissue is common to stems and leaves, forming passages between the submerged and the superficial tissues. In the photosynthetic process, oxygen, which is stored in the intercellular spaces to be used later in respiration, is a by-product that is liberated.

The leaves of the lily are circular or kidney-like forms, with plenty of large stoma that are always open in both sides, with vesicular petioles that act as flotation devices.

The seeds sink underwater, remaining there during low temperature periods and latent droughts. Reproduction can be both sexual and asexual. The sexual reproduction process is slow because a seed takes up to 2 months to mature, and needs the right conditins to do so. Asexual reproduction is vegetative, and very fast (a pair of lily can reproduce 1200 individuals in 130 days). Vegetative reproduction is made through structures called Stolons, which form from the leaves' rosettes, though they can reproduce also from bulbs and lysosomes. A medium vine may contain two million plants per hectare, and its total weight can be 270 to 400 metric tons per hectare.

Since the water lily has no substantial economic justification, it has reached nuisance proportions in Mexico, and is considered detrimental to the environment. For example, when decomposing, the water lily contributes great quantities of organic matter that forms sediment and consumes large quantities oxygen, which in turn deprives other organisms. Studies done at Paltzcuaro Lake in Mexico show that organic matter represents 10% of the plant, with a production of almost 60 tons of sediment in 60 days, per hectare. The water lily produces water loss in the host body of water by evapotranspiration that is 3 to 4 times as much as water without the lily.

If the productive use could be made of the water lily, as envisioned by this invention, the potential annual productivity of water lily is estimated at 10 to 30 metric tons of dry matter per hectare.

The method of utilizing the superabundant water lily to remove oil spills will now be described with reference to FIG. 1. The water or aquatic lily is first harvested by any well known mechanical or manual means. The entire lily plant is then laid out to dry. The drying can be achieved by solar radiation, other well known radiations, or the application of heat.

The dried lily plant is then pulverized into powdered form and applied to the petroleum product spill. The water lily in its natural state has a high hygroscopic characteristic due to its great quantity of spongy tissue used to transport and store air, and accordingly it can absorb large quantities of hydrocarbons and petroleum products into the air spaces that the dried lily product contains.

The dried and pulverized water lily can be applied manually or dusted from a vessel or an airplane. Well known air compression sprayers can also be used.

For the recollection of petroleum products in water, the lily powder preferably is applied uniformly over the surface, depending on the thickness of the oil film in the water, in a ratio of approximately 1 to 4 (1 kilogram of powder for each 4 Liters of hydrocarbon product to be collected).

This ratio of lily is the one with which the best results have been obtained for crude oils with a specific gravity from 0.84 to 0.91. These ratios should be adjusted to achieve the optimum results, according to tests that can be performed on all types of hydrocarbons.

In the case of the application of the lily powder on soils contaminated with hydrocarbons, it should be applied proportionately to the volume of oil that is on the surface or impregnated in the soil. The proportion is selected to form an agglomerate that integrates into the terrain by mechanical or manual means, depending on the conditions of the terrain onto which the lily powder is to be applied and of the resources available to restore and permit the vegetal regeneration planned in the affected areas. For this kind of soil restoration a basic ratio of 2 kilograms of pulverized lily for each square meter of affected terrain can be used. This ratio has been tested in very impregnated terrains, and should vary in view of the impregnation degree and the characteristics of the petroleum products contained in those areas.

After application on a water surface or on the soil the resultant agglomerate of oil and water lily powder posseses unexpectedly favorable properties. Upon contact with oil the vegetal product absorbs the hydrocarbons because of its natural hydrophilic properties, permitting the agglomerate to be easily removed from bodies of water by use of floating booms and other well known equipment, or can be gathered and disposed of if the spill is on land. Complete removal is not a concern as the resultant agglomerate is a natural product with a high nutriet value and is not harmful to aquatic species. Also, on land the resulting agglomerate can be used as a substrate to establish vegetation and also possesses valuable fertilizing properties.

Minimal risks are associated with an over application of the water lily powder. In the situation of application on land the powder would introduce organic matter and certain nutrients that can be utilized by vegetation. Similarly, on water and as wash-up material on shore, the agglomerate will not adversely effect the ecology.

The following tests have been performed which conclusively show the beneficial and unharmful effects of the resulting agglomerate:

a) Into a bowl containing live fish a certain volume of crude oil was introduced. It was noted that the fish sought refuge in the bottom of the fish bowl. Powdered lily was immediately applied over the poured crude, readily absorbing the crude oil and allowing the resulting agglomerate to be easily removed from the water without leaving a hydrocarbon residue over the water's surface. It was observed that the fish ate the residual powder quickly. This operation was repeated several times during six months without the fish being adversely affected in any way.

b) Controlled seeding of bean, corn and grass was done in defined square areas, where lily crude oil agglomerate was added in various proportions to the soil, but leaving one area without any agglomerate at all. It was observed that the best results were obtained with the seedings where agglomerate was applied in ratios of 1 Kg. of lily powder to 4 Kgs. of Crude, and 1 Kg. to 3 Kgs. of crude, even over the results obtained in the area where no agglomerate was added.

c) The water lily powder was applied to a flowing water stream that was contaminated by natural emanations of oil, under the following procedure: A floating barrier was installed to limit the test area. The approximate volume of petroleum product contained on the surface of the test area was evaluated, and the lily powder was applied manually over the area covered with the oil. The lily-oil agglomerate was swept to the bank of the stream where it was removed and disposed of on the ground of the bank, leaving the test area without oil contamination.

d) Another test was made to restore oil contaminated soil using powdered water lily on a field of about 30 square meters in following the procedure: An area with puddled oil was selected near the pumps that remove the natural emanations from the field. Powdered water lily was applied on the terrain in a concentration of 2 Kgs per square meter. Using shovels, the surface of this terrain was turned to incorporate the lily powder and the oil into the ground, leaving the area with a light brown coloration and a pleasing smell, and without noticeable presence of oil on the ground. In the turned area, "Estrella" grass was successfully seeded, resulting in a radical and satisfactory change from the conditions which prevailed previous to the application of the powdered lily. It is important to note that the grass grew better, even without water, in areas where the lily powder was added to achieve oil removal, as compared to watered areas containing oil which was not collected by application of the powdered lily.

In view of its availability, costs for converting water lilies into powder are very low. The lily powder is a non-toxic and biodegradable product having positive ecological effects. The residue of excessive application of the powder serves as food for existing fauna in bodies of water to which it is applied.

When mixed with petroleum products which contaminate the land, the mixture forms an aggregate that fertilizes the vegetation, and when applied to petroleum contaminated bodies of water, the aggregate is safely eaten by the fauna. The powdered water lily is a product that can economically be substituted for existing dispersants and can be applied without limitations to all bodies of water.

Although the method has been described in terms of removing oil or petroleum products, these terms are considered to include the entire spectrum of liquid hydrocarbon petroleum products, including, but not limited to, crude oils as well as refined products.

I claim:

1. A method for the absorption of liquid petroleum products comprising applying a powder of dried and pulverized aquatic water lily to a body of the liquid petroleum product to absorb said product.

2. The method of claim 1 wherein said petroleum product is crude oil.

3. A method for the absorption of liquid petroleum products comprising harvesting aquatic lily, drying the harvested aquatic lily, pulverizing the dried aquatic lily to form a powder; applying said powder to a body of the liquid petroleum product to absorb said product.

4. A method of removing liquid petroleum products from a body of water comprising applying a powder of dried and pulverized aquatic water lily to the liquid petroleum product and to absorb the petroleum product and to form a resulting agglomerate, removing the resulting agglomerate from the body of water.

5. The method of claim 4 wherein the step of applying a powder comprises applying said powder in a substantially uniform manner to cover the surface of the liquid petroleum product.

6. The method of claim 5 wherein the step of applying a powder comprises applying said powder in a ratio of approximately 1 kilogram of powder for each 4 liters of petroleum products.

* * * * *